United States Patent
Sadakane et al.

(10) Patent No.: US 11,870,053 B2
(45) Date of Patent: Jan. 9, 2024

(54) SECONDARY-BATTERY NEGATIVE ELECTRODE AND MANUFACTURING METHOD THEREOF, AND SECONDARY BATTERY

(71) Applicant: Panasonic Intellectual Property Management Co., Ltd., Osaka (JP)

(72) Inventors: Takuya Sadakane, Osaka (JP); Hiroshi Kawada, Hyogo (JP); Atsushi Fukui, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 100 days.

(21) Appl. No.: 16/576,214

(22) Filed: Sep. 19, 2019

(65) Prior Publication Data
US 2020/0020927 A1   Jan. 16, 2020

Related U.S. Application Data

(63) Continuation of application No. PCT/JP2018/003941, filed on Feb. 6, 2018.

(30) Foreign Application Priority Data

Mar. 22, 2017  (JP) .................................. 2017-055256

(51) Int. Cl.
*H01M 4/133* (2010.01)
*H01M 4/583* (2010.01)
(Continued)

(52) U.S. Cl.
CPC ......... *H01M 4/133* (2013.01); *H01M 4/1393* (2013.01); *H01M 4/583* (2013.01);
(Continued)

(58) Field of Classification Search
CPC .... H01M 4/133; H01M 4/1393; H01M 4/583; H01M 4/625; H01M 10/0525;
(Continued)

(56) References Cited

U.S. PATENT DOCUMENTS

2004/0023114 A1*  2/2004  Sada ................. H01M 10/0565
                                                    429/231.4
2005/0084760 A1   4/2005  Hwang et al.
(Continued)

FOREIGN PATENT DOCUMENTS

JP  2000-268878 A  9/2000
JP  2005-108835 A  4/2005
(Continued)

OTHER PUBLICATIONS

International Search Report dated May 1, 2018, issued in counterpart Application No. PCT/JP2018/003941 (2 pages).

*Primary Examiner* — Matthew T Martin
*Assistant Examiner* — Grace Ann Kenlaw
(74) *Attorney, Agent, or Firm* — WHDA, LLP

(57) ABSTRACT

A secondary-battery negative electrode includes: a negative electrode collector; and a negative electrode active material layer provided on a surface of the negative electrode collector, and the negative electrode active material layer includes active material particles and amorphous carbon which covers at least parts of surfaces of the active material particles. At least a part of a surface of the amorphous carbon is covered with a film having a lithium ion permeability, the film contains an element M, and the element M is at least one selected from the group consisting of P, Si, B, V, Nb, W, Ti, Zr, Al, Ba, La, and Ta.

11 Claims, 1 Drawing Sheet

(51) Int. Cl.
  *H01M 4/62* (2006.01)
  *H01M 10/0525* (2010.01)
  *H01M 10/0568* (2010.01)
  *H01M 4/02* (2006.01)
  *H01M 4/1393* (2010.01)

(52) U.S. Cl.
  CPC ....... *H01M 4/625* (2013.01); *H01M 10/0525* (2013.01); *H01M 10/0568* (2013.01); *H01M 2004/027* (2013.01)

(58) Field of Classification Search
  CPC ....... H01M 10/0568; H01M 2004/027; H01M 4/628; H01M 10/0567; H01M 4/587; H01M 4/366
  See application file for complete search history.

(56) References Cited

U.S. PATENT DOCUMENTS

| | | | |
|---|---|---|---|
| 2006/0281004 A1* | 12/2006 | Yata | H01M 4/587 429/162 |
| 2009/0004569 A1 | 1/2009 | Yamamoto et al. | |
| 2009/0111020 A1* | 4/2009 | Yamaguchi | H01M 10/0569 429/207 |
| 2013/0177808 A1 | 7/2013 | Wang et al. | |
| 2013/0266858 A1 | 10/2013 | Inoue et al. | |
| 2014/0134492 A1 | 5/2014 | Yamami et al. | |
| 2014/0186722 A1* | 7/2014 | Lim | H01M 10/0567 429/331 |
| 2014/0342241 A1 | 11/2014 | Lim et al. | |
| 2016/0315309 A1 | 10/2016 | Inoue et al. | |
| 2017/0288205 A1* | 10/2017 | Inoue | H01G 11/50 |
| 2018/0108939 A1 | 4/2018 | Higuchi et al. | |
| 2018/0183037 A1 | 6/2018 | Inoue et al. | |

FOREIGN PATENT DOCUMENTS

| | | |
|---|---|---|
| JP | 2008305722 A * | 12/2008 |
| JP | 2013-143375 A | 7/2013 |
| JP | 2013-232403 A | 11/2013 |
| JP | 2014232704 A * | 12/2014 |
| JP | 2015-523701 A | 8/2015 |
| JP | 2016-46204 A | 4/2016 |
| JP | 2017-54615 A | 3/2017 |
| WO | 2007/086603 A1 | 8/2007 |
| WO | 2013/002162 A1 | 1/2013 |
| WO | 2016/157735 A1 | 10/2016 |

* cited by examiner

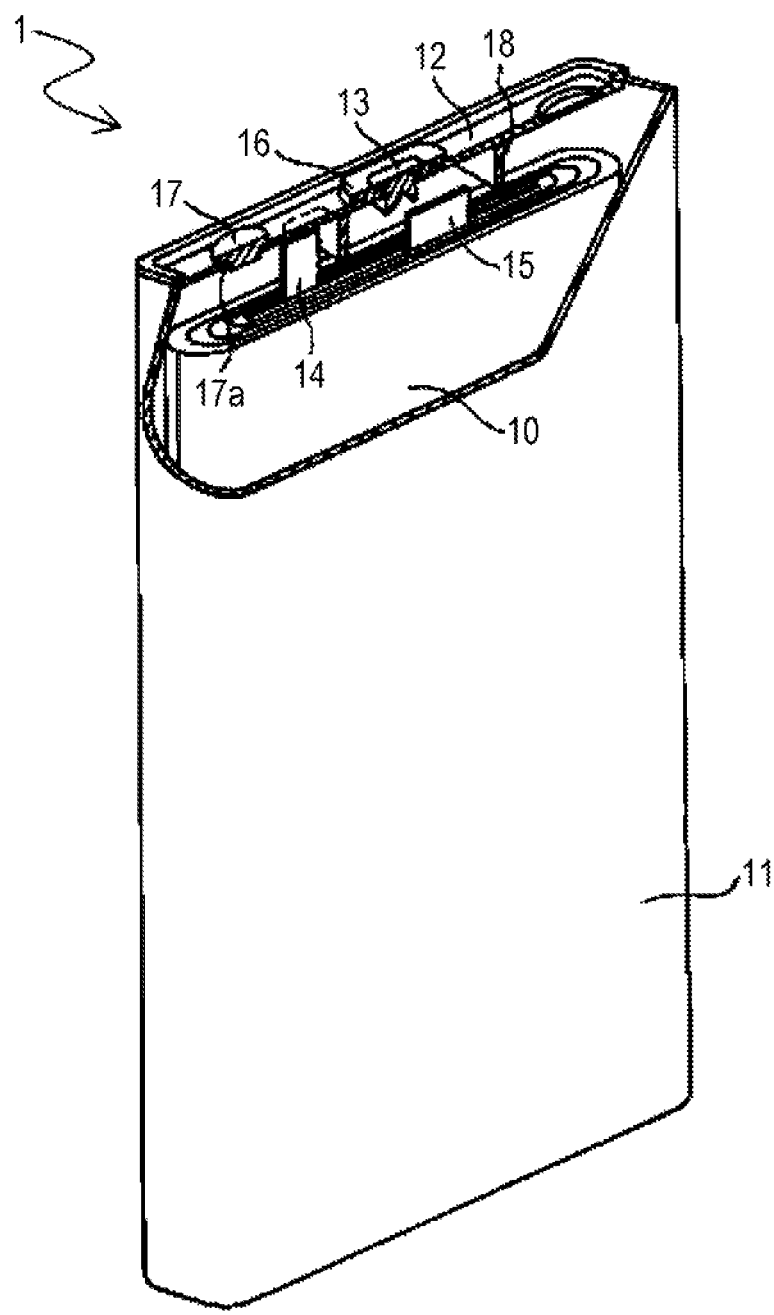

SECONDARY-BATTERY NEGATIVE ELECTRODE AND MANUFACTURING METHOD THEREOF, AND SECONDARY BATTERY

TECHNICAL FIELD

The present disclosure primarily relates to an improvement of a secondary-battery negative electrode.

BACKGROUND ART

Many nonaqueous electrolyte secondary batteries represented by a lithium ion secondary battery use graphite as a negative electrode active material. However, when graphite is used, an improvement in input/output characteristics is limited. On the other hand, in order to improve the input/output characteristics, the use of a negative electrode active material including graphite particles and layers which contain amorphous carbon and which cover at least parts of surfaces of the graphite particles has been proposed (PTL 1).

In addition, in order to reduce the activity at edge faces of graphite crystallites and to suppress decomposition of an electrolyte liquid, as a negative electrode active material, the use of a carbon material formed of graphite particles and carbonaceous particles which cover at least parts of surfaces thereof and in which the graphitization is not advanced has been proposed (PTL 2).

CITATION LIST

Patent Literature

PTL 1: Japanese Published Unexamined Patent Application No. 2016-46204
PTL 2: Japanese Published Unexamined Patent Application No. 2000-268878

SUMMARY OF INVENTION

Technical Problem

However, when amorphous carbon is only provided on a surface of a negative electrode active material, it is difficult to sufficiently improve the input/output characteristics. In addition, an electrolyte liquid is liable to be decomposed on a surface of amorphous carbon, and in particular, at an initial charge/discharge stage, the charge/discharge efficiency tends to decrease.

In consideration of the situation described above, one aspect of the present disclosure relates to a secondary-battery negative electrode which comprises: a negative electrode collector; and a negative electrode active material layer provided on a surface of the negative electrode collector. In the secondary-battery negative electrode described above, the negative electrode active material layer includes active material particles and amorphous carbon which covers at least parts of surfaces of the active material particles, at least a part of a surface of the amorphous carbon is covered with a film having a lithium ion permeability, the film contains an element M, and the element M is at least one selected from the group consisting of P, Si, B, V, Nb, W, Ti, Zr, Al, Ba, La, and Ta.

Another aspect of the present disclosure relates to a secondary battery which comprises a positive electrode, the negative electrode described above, and an electrolyte having a lithium ion conductivity.

A still another aspect of the present disclosure relates to a method for manufacturing a secondary-battery negative electrode, the method comprising: a step (i) of preparing a negative electrode precursor which includes a negative electrode collector and a negative electrode active material layer provided on a surface of the negative electrode collector; and a step (ii) of covering at least a part of a surface of the negative electrode active material layer with a film having a lithium ion permeability. In the method described above, the negative electrode active material layer described above includes active material particles and amorphous carbon which covers at least parts of surfaces of the active material particles; the film described above contains an element M, and the element M is at least one selected from the group consisting of P, Si, B, V, Nb, W, Ti, Zr, Al, Ba, La, and Ta; and in the step (ii), the film is formed by exposing the negative electrode precursor to an atmosphere at 200° C. or less containing a raw material of the film.

According to the present disclosure, a secondary battery having improved input/output characteristics can be provided while the charge/discharge efficiency thereof is maintained.

BRIEF DESCRIPTION OF DRAWINGS

FIG. 1 is a partially cutaway perspective view of a secondary battery according to one embodiment of the present disclosure.

DESCRIPTION OF EMBODIMENT

A secondary-battery negative electrode according to an embodiment of the present disclosure comprises a negative electrode collector and a negative electrode active material layer provided on a surface of the negative electrode collector. The negative electrode active material layer includes active material particles and amorphous carbon which covers at least parts of surfaces of the active material particles, and at least a part of a surface of the amorphous carbon is covered with a film having a lithium ion permeability.

Hereinafter, the film having a lithium ion permeability is also called "ion permeability film". In addition, the active material particles, at least parts of the surfaces of which are covered with the amorphous carbon, are also simply called "negative electrode active material particles".

The ion permeability film contains an element M, and the element M is at least one selected from the group consisting of P, Si, B, V, Nb, W, Ti, Zr, Al, Ba, La, and Ta. Among those elements mentioned above, since the raw material is inexpensive, at least one element selected from the group consisting of P, Si, and B is preferable.

The lithium ion permeability film which covers at least a part of the surface of the amorphous carbon is formed, for example, by covering at least a part of the surface of the negative electrode active material layer with a lithium ion permeability film. The surface of the negative electrode active material layer is not limited to a surface of the negative electrode active material layer which faces a positive electrode with a separator interposed therebetween, and the surface of the negative electrode active material layer also includes inner walls of voids in a porous negative electrode active material layer. Many of the inner walls of the voids are formed in the surfaces of the negative electrode active material particles or in the amorphous carbon. That is, the ion permeability film which covers the surface of the negative electrode active material layer covers at least a part of the surface of the amorphous carbon.

Since at least a part of the surface of the amorphous carbon is covered with the ion permeability film, a reaction resistance of the negative electrode active material layer is significantly decreased, and in addition, the activity of a reaction site of the amorphous carbon which decomposes an electrolyte liquid is decreased. Hence, the input/output characteristics of the negative electrode are significantly improved, and in addition, the decrease in charge/discharge efficiency and the degradation of the negative electrode by high-temperature storage can be suppressed.

As the active material particles, for example, graphite particles are preferably used. However, the graphite particles are repeatedly expanded and contracted in association with charge/discharge. When the surface of the graphite particle is directly covered with the ion permeability film, the ion permeability film is liable to receive an intensive stress. The ion permeability film which covers the graphite particle with the amorphous carbon interposed therebetween is not likely to be influenced by expansion and contraction of the graphite particle. The ion permeability film is not likely to be peeled away from the amorphous carbon, is excellent in durability, and is also not likely to be damaged, such as cracked.

The ion permeability film is preferably formed of a lithium compound containing the element M, an element A, and lithium. The element A is preferably at least one selected from the group consisting of F, S, O, N, and Br. The lithium compound as described above is stable in a battery, is likely to form a uniform film, and also has an excellent ion permeability.

The amorphous carbon is preferably a fired product of pitch, tar, or the like. In particular, the pitch is a liquid having an appropriate viscosity, is suitable to be mixed with the active material particles, and is able to cover many parts of the surfaces of the active material particles.

The amorphous carbon may contain carbon black. Since having a following property to the change in volume of active material particles in association with insertion and release of Li ions, when carbon black is disposed on the surfaces of the active material particles, for example, cracks in association with the change in volume of the active material particles can be suppressed. In addition, since carbon black is contained in the amorphous carbon, the ion permeability film is more unlikely to be peeled away from the amorphous carbon, is more excellent in durability, and is more unlikely to be damaged, such as cracked. In addition, when carbon black is contained in the amorphous carbon, the electrical conductivity of the negative electrode is improved, and hence, the efficiency of high-rate charge/discharge is also improved.

The carbon black is carbon fine particles which are primarily produced by pyrolysis of hydrocarbons and which have controlled powder characteristics. As the carbon black, for example, furnace black, acetylene black, or Ketjen black may be used. The size of primary particle of the carbon black is approximately several nanometers to three hundred nanometers, and most of the primary particles have a size of 10 to 50 nm. A structural configuration in which primary particles are sequentially connected to each other is evaluated by the amount of DBP (dibutyl phthalate) oil absorption. The amount of DBP oil absorption may be, for example, 100 ml/100 g to 300 ml/100 g. The BET specific surface area of the carbon black measured by adsorption/desorption of a nitrogen gas may be, for example, 10 to 400 $m^2/g$.

The carbon black is preferably used by mixing with pitch, tar, or the like. In this case, the amorphous carbon is a composite of the carbon black and a fired product of pitch, tar, or the like. The rate of the carbon black in the amorphous carbon may be, for example, 10 to 50 percent by mass.

Next, a method for manufacturing a secondary-battery negative electrode according to the embodiment of the present disclosure will be described.

First of all, a method to cover at least parts of the surfaces of the active material particles with the amorphous carbon will be described by way of example. First, there may be mentioned a method in which after the active material particles are mixed with the amorphous carbon, a shear force is applied to the mixture thus obtained. As the amorphous carbon, for example, carbon black, graphitizable carbon, or non-graphitizable carbon may be used. In order to apply a shear force to the mixture, for example, a shear mixer, a ball mill, or a bead mill may be used.

Secondary, there may be mentioned a method in which after the active material particles are mixed with a raw material of the amorphous carbon, and at least parts of the surfaces of the active material particles are covered with the raw material of the amorphous carbon, the mixture thus obtained is fired. The raw material is carbonized by firing, so that the amorphous carbon is produced. A firing temperature is set to a temperature (800° C. to 2,000° C.) at which graphitization is not advanced. A firing atmosphere is preferably an inert atmosphere of nitrogen, argon, or the like. As the raw material of the amorphous carbon, when a liquid, such as pitch or tar, having a viscosity is used, for an operation of covering at least parts of the surfaces of the active material particles with the raw material of the amorphous carbon, a fluidized bed is preferably used. A liquid, such as pitch or tar, having a viscosity may also be used together with carbon black. For example, a mixture of a liquid having a viscosity and carbon black may be used in combination as the raw material of the amorphous carbon. As the raw material of the amorphous carbon, an organic high molecular weight material may also be used. In this case, by spraying a high molecular weight material solution to the active material particles, followed by drying, at least parts of the surfaces of the active material particles may be covered with the organic high molecular weight material.

Thirdly, by heating the active material particles in a hydrocarbon-based gas atmosphere, amorphous carbon generated by pyrolysis of a hydrocarbon-based gas may be deposited on the surfaces of the active material particles. As the hydrocarbon-based gas, for example, methane, ethane, ethylene, propylene, or acetylene may be used.

Next, by using the active material particles, at least parts of the surfaces of which are covered with amorphous carbon, that is, by using the negative electrode active material particles, a negative electrode precursor including a negative electrode collector and a negative electrode active material layer provided on a surface of the negative electrode collector is prepared (Step (i)). As described later, the negative electrode active material layer is formed from a negative electrode slurry which is a mixture formed of a dispersion medium and a mixture agent including the negative electrode active material particles. In this case, the negative electrode slurry may be prepared using negative electrode active material particles in which an ion permeability film which covers at least a part of the surface of the amorphous carbon is formed, or the negative electrode slurry may be prepared using negative electrode active material particles including no ion permeability film. When the negative electrode active material particles including no ion permeability film is used, after the negative electrode precursor is prepared, a step (Step (ii)) of covering at least a part of the surface of the negative electrode active material layer with the ion permeability film may be performed.

The ion permeability film is preferably formed by exposing the negative electrode precursor to an atmosphere containing the raw material thereof at 200° C. or less or preferably at 120° C. or less. Accordingly, even if a binder having a low heat resistance temperature is contained in the negative electrode active material layer, without degrading the binder, the film can be formed on the surface of the negative electrode active material layer. The ion permeability film is preferably formed by a liquid phase method or a vapor phase method. In addition, before the negative electrode slurry is prepared, when the ion permeability film is formed on the negative electrode active material particles in advance, the temperature of the atmosphere containing the raw material of the ion permeability film may be further increased.

As the liquid phase method, for example, a precipitation method or a sol-gel method is preferable. As the precipitation method, for example, there may be mentioned a method in which the negative electrode precursor or the negative electrode active material particles are immersed in a solution at a temperature sufficiently lower than less than 120° C. in which the raw material of the ion permeability film is dissolved, and the ion permeability film is precipitated on the surface of the negative electrode active material layer or the surfaces of the negative electrode active material particles, or a method in which a solution in which the raw material of the ion permeability film is dissolved is sprayed on the negative electrode precursor or the negative electrode active material particles, followed by drying. As the sol-gel method, for example, there may be mentioned a method in which after the negative electrode precursor or the negative electrode active material particles are immersed in a solution at a temperature sufficiently lower than less than 120° C. in which the raw material of the ion permeability film is dissolved, intermediate particles of the ion permeability film are deposited on the surface of the negative electrode active material layer or the surfaces of the negative electrode active material particles and are then gelled.

As the vapor phase method, for example, there may be mentioned a physical vapor deposition method (PVD), a chemical vapor deposition method (CVD), or an atomic layer deposition method (ALD). In general, PVD and CVD are each performed at a high temperature of more than 200° C. On the other hand, according to ALD, in an atmosphere containing the raw material of the film at 200° C. or less or further at 120° C. or less, the film can be formed.

In the ALD method, as the raw material of the film, an organic compound having a high vapor pressure is used. Since the raw material as described above is vaporized, a molecular raw material is able to interact with the surface of the negative electrode active material layer or the surfaces of the negative electrode active material particles. The molecular raw material is likely to reach voids in the negative electrode active material layer, and hence, a uniform film can be easily formed also on the inner wall of the void.

When the ion permeability film is formed after the formation of the negative electrode active material layer, the ion permeability film can cover not only the surface of the negative electrode active material layer but also a part of the surface of the negative electrode collector. The surface of the negative electrode collector has minute exposed surfaces in microscopic view. In addition, a cut end surface or a lead fitted portion of the negative electrode collector may also be exposed in some cases. Since the exposed surfaces as described above are covered with the ion permeability film, decomposition of an electrolyte liquid starting from the surface of the negative electrode collector can also be suppressed.

In addition, when the ion permeability film is formed after the negative electrode active material layer is formed, at an adhesion interface between the binder and the active material particles covered with the amorphous carbon, a region in which the ion permeability film is not present exists. As is the case described above, at a contact interface between the negative electrode collector and the active material particles covered with the amorphous carbon, a region in which the ion permeability film is not present also exists. Furthermore, at a contact interface between the active material particles covered with the amorphous carbon, a region in which the ion permeability film is not present also exists.

Even when the surface of the negative electrode active material layer or the surfaces of the negative electrode active material particles are covered with the ion permeability film, it is difficult to completely prevent the decomposition of the electrolyte liquid which proceeds in the battery. Hence, at an outer side of the ion permeability film, another film (hereinafter, referred to as "SEI") may be generated in some cases. In this case, by a multilayer film including the ion permeability film as an inner layer and SEI as an outer layer, the surface of the negative electrode active material layer is covered. In general, the composition of constituent elements of the inner layer is different from that of the outer layer, and in one of the inner layer and the outer layer, an element which is not contained in the other one of the inner layer and the outer layer is contained. SEI contains an element derived from a component contained in the electrolyte liquid.

In the case in which the negative electrode active material layer includes the multilayer film, when the structure of the multilayer film is analyzed in the thickness direction thereof, a concentration C1 (of at least one selected from the element M, the element A, and lithium) of the inner layer, that is, the ion permeability film, is low at an outer layer side and is high at an inner layer side. The analysis as described above may be performed by XPS, EPMA, or the like.

The maximum value (concentration C1max) of the concentration C1 is preferably 1.5 times or more a concentration C1sr at a surface side of the multilayer film, more preferably 2 times or more, and further preferably 5 times or more. In this case, it can be said that the surface of the negative electrode active material layer is sufficiently covered with the ion permeability film, and as a result, the generation of SEI is suppressed. In addition, the surface side of the multilayer film may be a region from the topmost surface of the film to a depth of 15% or less of the thickness thereof.

As the lithium compound containing the element M, the element A, and lithium, a lithium salt of a polyanion is preferable. The polyanion is a molecular ion species represented, for example, by a composition formula: $[MA_y]^{x-}$. However, the number of central atoms M is not limited to one, and the central atom M is not limited to one type. A lithium salt of a polyanion containing the element M and the element A represented by a composition formula: $Li_xMA_y$ includes an A-Li bond (such as O—Li bond) having an ion binding property and exhibits a lithium ion conductivity since lithium ions hop at the A sites. In particular, a polyoxymetalate compound is preferable since being stable. In addition, the range of X is, for example, $0.5 \leq x \leq 4$, and $1 \leq y \leq 6$ is preferable.

As the polyoxymetalate compound, for example, $Li_3PO_4$, $Li_4SiO_4$, $Li_2Si_2O_5$, $Li_2SiO_3$, $Li_3BO_3$, $Li_3VO_4$, $Li_3NbO_4$, $LiZr_2(PO_4)$, $LiTaO_3$, $Li_4Ti_5O_{12}$, $Li_7La_3Zr_2O_{12}$, $Li_5La_3Ta_2O_{12}$, $Li_{0.35}La_{0.55}TiO_3$, $Li_9SiAlO_8$, and $Li_{1.3}Al_{0.3}Ti_{1.7}(PO_4)_3$ may be used alone, or at least two types thereof may be used in arbitrary combination. Among those compounds mentioned above, since being excellent in lithium ion permeability, at least one selected from the group consisting of $Li_3PO_4$, $Li_4SiO_4$, $Li_2Si_2O_5$, $Li_2SiO_3$, $Li_3BO_3$, $Li_3VO_4$, and $Li_3NbO_4$ is preferably used. In particular, since being not likely to perform a side reaction which causes gas generation and being relatively inexpensive, $Li_4SiO_4$ is preferable. $Li_4SiO_4$ having a high lithium content is believed that a side reaction which incorporates lithium ions is not likely to occur. The polyoxymetalate compound preferably contains at least $Li_4SiO_4$. In addition, a lithium silicate, such as $Li_4SiO_4$, $Li_2Si_2O_5$, or $Li_2SiO_3$, also has a good compatibility with alloy-based active material particles (such as a silicon oxide or a silicon alloy) containing silicon.

Hereinafter, one example of a sheet-shaped negative electrode which forms a winding type or a laminate type electrode group will be described.

(Negative Electrode)

The sheet-shaped negative electrode includes a sheet-shaped negative electrode collector, a negative electrode active material layer formed on a surface of the negative electrode collector, and a film formed on a surface of the negative electrode active material layer. The negative electrode active material layer may be formed on one surface of the negative electrode collector or on each of two surfaces thereof.

(Negative Electrode Collector)

As the negative electrode collector, for example, there may be mentioned metal foil, a metal sheet, a mesh body, a punched sheet, or an expanded metal. As a material of the negative electrode collector, for example, stainless steel, nickel, copper, or a copper alloy may be used. The thickness of the negative electrode collector may be selected from a range of, for example, 3 to 50 μm.

(Negative Electrode Active Material Layer)

The case in which the negative electrode active material layer is a mixture (mixture agent) including active material particles (negative electrode active material particles), at least parts of surfaces of which are covered with amorphous carbon, will be described by way of example. The negative electrode active material layer contains as essential components, the negative electrode active material particles and a binder, and may contain as an arbitrary component, an electrically conductive agent.

The amount of the binder contained in the negative electrode active material layer is, with respect to 100 parts by mass of the negative electrode active material particles, preferably 0.1 to 20 parts by mass and more preferably 1 to 5 parts by mass. The thickness of the negative electrode active material layer is, for example, 10 to 100 μm.

The active material particles may be either non-carbon-based particles or carbon particles, or may be particles containing both of them in combination. As the carbon particles, for example, graphite or hard carbon is preferable. In particular, since having a high capacity and a small irreversible capacity, graphite is preferable.

The graphite is a generic name of carbon materials having a graphite structure and includes natural graphite, artificial graphite, expanded graphite, graphitized mesophase carbon particles, and the like. As the natural graphite, for example, flaky graphite or earthy graphite may be mentioned. In general, a carbon material in which the interplanar spacing $d_{002}$ of the (002) plane of the graphite structure calculated from an X-ray diffraction spectrum is 3.35 to 3.44 Å is classified in the graphite. On the other hand, hard carbon is a carbon material in which fine graphite crystals are arranged in random directions and are further hardly graphitized, and the interplanar spacing $d_{002}$ of the (002) plane is larger than 3.44 Å.

As the non-carbon-based particles, alloy-based particles are preferable. The alloy-based particles preferably contain silicon, tin, or the like. In particular, for example, a silicon element, a silicon compound, or a silicon alloy is preferable. As the silicon compound, a silicon oxide is preferable.

In order to improve a filling property of the negative electrode active material in the negative electrode active material layer, the average particle diameter (D50) of the negative electrode active material particles is preferably sufficiently small as compared to the thickness of the negative electrode active material layer. The average particle diameter (D50) of the negative electrode active material particles is, for example, preferably 5 to 30 μm and more preferably 10 to 25 μm. In addition, the average particle diameter (D50) indicates a median diameter at which the cumulative volume in a volume-based particle size distribution is 50%. The average particle diameter may be measured, for example, using a laser diffraction/scattering type particle size distribution measurement device.

As the binder, for example, there may be mentioned a fluorine resin, such as a poly(vinylidene fluoride) (PVdF), a polytetrafluoroethylene (PTFE), or a tetrafluoroethylene-hexafluoropropylene copolymer (HFP); an acrylic resin, such as a poly(methyl acrylate) or an ethylene-methyl methacrylate copolymer; a rubber material, such as a styrene-butadiene rubber (SBR) or an acrylic rubber; or a water-soluble high molecular weight material, such as a carboxymethyl cellulose (CMC) or a poly(vinyl pyrrolidone).

As the electrically conductive agent, carbon black, such as acetylene black or Ketjen black, is preferable.

The negative electrode active material layer may be formed in such a way that after a negative electrode slurry is prepared by mixing a mixture agent including the negative electrode active material particles, the binder, and the like with a dispersion medium, the negative electrode slurry is applied to the surface of the negative electrode collector, followed by drying and rolling. As the dispersion medium, for example, water, an alcohol, such as ethanol, an ether, such as tetrahydrofuran, or N-methyl-2-pyrrolidone (NMP) may be used. When water is used as the dispersion medium, as the binder, a rubber material and a water-soluble high molecular weight material are preferably used in combination.

(Ion Permeability Film)

The thickness of the ion permeability film which covers the surface of the negative electrode active material layer may be set so as to suppress the contact between the negative electrode active material particles and the electrolyte liquid. The ion permeability film preferably forms a uniform layer covering the surface of the negative electrode active material layer with a necessary and sufficient amount. The thickness of the ion permeability film is preferably smaller than the average particle diameter of the negative electrode active material particles and is, for example, preferably 0.1 μm (100 nm) or less and more preferably 0.03 μm (30 nm) or less. However, when the thickness of the ion permeability film is excessively decreased, electron transfer occurs by the tunnel effect, and reduction decomposition of the electrolyte liquid may proceed in some cases. In order to suppress the electron transfer and to smoothly transfer lithium ions, the thickness of the ion permeability film is preferably 0.5 nm or more.

The lithium ion permeability of the ion permeability film may be set so that lithium ions present in the vicinity of the negative electrode active material particles are allowed to come in and out of the negative electrode active material particles, and the ion permeability film is not required to have a high lithium ion conductivity. Although the ion permeability film may be formed of a material having a lithium ion conductivity of, for example, $1.0 \times 10^{-9}$ S/cm or more, a material having a lithium ion conductivity of $1.0 \times 10^{-8}$ S/cm or more is preferable. On the other hand, in order to suppress the reduction decomposition of the electrolyte liquid as much as possible, the electron conductivity of the film is preferably low, and the electron conductivity is preferably lower than $1.0 \times 10^{-2}$ S/cm or less.

In order to secure the negative electrode capacity, the content rate of the ion permeability film in the negative electrode is preferably decreased as much as possible. In order to allow lithium ions to easily come in and out of the negative electrode active material particles, the ion permeability film is preferably formed to be thin and uniform as much as possible. The amount of the ion permeability film contained in the negative electrode is, with respect to 100 parts by mass of the negative electrode active material particles, preferably 0.01 to 10 parts by mass and more preferably 0.05 to 5 parts by mass.

Next, a method to form the ion permeability film for the negative electrode precursor by an ALD method will be described in detail. By the ALD method, for example, in accordance with the following procedure, a film covering the negative electrode active material layer is formed.

First, in a reaction chamber in which the negative electrode precursor is received, a first gaseous raw material (such as a supply source of the element M and the element A) is charged. Accordingly, the negative electrode precursor is exposed to an atmosphere containing the first raw material. Subsequently, when the surface of the negative electrode active material layer is covered with a monomolecular layer of the first raw material, a self-stop mechanism by an organic group of the first raw material functions, so that the first raw material is not further adsorbed on the surface of the negative electrode active material layer. An excess first raw material is purged by an inert gas or the like and is eliminated from the reaction chamber.

Next, in the reaction chamber in which the negative electrode precursor is received, a second gaseous raw material (such as a supply source of lithium) is charged. Accordingly, the negative electrode precursor is exposed to an atmosphere containing the second raw material. In this case, when a reaction between the monomolecular layer of the first raw material and the second raw material is completed, the second raw material is not further adsorbed on the surface of the negative electrode active material layer. An excess second raw material is purged by an inert gas or the like and is eliminated from the reaction chamber.

As described above, by repeatedly performing a series of operations including the introduction of the first raw material, the purge, the introduction of the second raw material, and the purge, a lithium compound containing the element M, the element A, and lithium is produced, so that the ion permeability film is formed.

The materials to be used as the first raw material and the second raw material by the ALD method are not particularly limited, and in accordance with a desired film, appropriate compounds may be selected. For example, as the first raw material, there may be mentioned a material (such as trimethyl phosphate, triethyl phosphate, tris(dimethylamino) phosphine, or trimethylphosphine) containing phosphorus as the element M, a material (such as tetramethyl orthosilicate or tetraethyl orthosilicate) containing silicon as the element M, a material (such as lithium(bistrimethylsilyl)amide) containing both lithium and the element M, or a material (such as lithium tert-butoxide or lithium cyclopentadienyl) used as a supply source of lithium.

As the first raw material, when the material containing the element M is used, as the second raw material, a material to be used as a supply source of lithium (or a material containing both the element M and lithium) may be used. As the first raw material, when the material to be used as a supply source of lithium is used, as the second raw material, a material containing the element M (or a material containing both the element M and lithium) may be used. As the first raw material, when the material containing both the element M and lithium is used, as the second raw material, an oxidant (such as oxygen or ozone) may be used.

Furthermore, at an arbitrary timing of the series of operations, in order to facilitate the reaction of each raw material, an oxidant may be introduced in the reaction chamber so as to be used together with the other raw materials. While the series of operations is repeatedly performed, the introduction of the oxidant may be performed at any timing or may be performed every time.

In addition, at least three types of raw materials may also be used. That is, besides the first raw material and the second raw material, at least one other raw material may also be used. For example, a series of operations including the introduction of the first raw material, the purge, the introduction of the second raw material, the purge, the introduction of a third raw material different from the first raw material and the second raw material, and the purge may be repeatedly performed.

Hereinafter, with reference to a square type winding type battery, constituent elements other than the negative electrode will be described in detail. However, the type, the shape, and the like of the secondary battery are not particularly limited.

FIG. 1 is a perspective view schematically showing a square type secondary battery according to one embodiment of the present disclosure. In FIG. 1, in order to show an important structure of a secondary battery 1, a partially cutaway structure is shown. In a square type battery case 11, a flat winding type electrode group 10 and an electrolyte liquid (not shown) are received.

To a positive electrode collector of a positive electrode included in the electrode group 10, one end of a positive electrode lead 14 is connected. The other end of the positive electrode lead 14 is connected to a sealing plate 12 functioning as a positive electrode terminal. To a negative electrode collector, one end of a negative electrode lead 15 is connected, and the other end of the negative electrode lead 15 is connected to a negative electrode terminal 13 provided at an approximately center of the sealing plate 12. Between the sealing plate 12 and the negative electrode terminal 13, a gasket 16 is disposed, so that insulation is performed therebetween. Between the sealing plate 12 and the electrode group 10, a frame body 18 formed from an insulating material is disposed, so that the negative electrode lead 15 is insulated from the sealing plate 12. The sealing plate 12 is welded to an opening end of the square type battery case 11, so that the square type battery case 11 is sealed. In the sealing plate 12, a liquid charge port 17a is formed, and through the liquid charge port 17a, the electrolyte liquid is charged in the square type battery case 11. Subsequently, the liquid charge port 17a is sealed by a sealing plug 17.

(Positive Electrode)

A sheet-shaped positive electrode includes a sheet-shaped positive electrode collector and a positive electrode active material layer provided on a surface of the positive electrode collector. As the positive electrode collector, for example, metal foil or a metal sheet may be mentioned. As a material of the positive electrode collector, for example, stainless steel, aluminum, an aluminum alloy, or titanium may be used. The positive electrode active material layer may be formed using a positive electrode slurry containing a positive electrode active material, a binding agent, and a dispersion medium by a method according to the manufacturing of the negative electrode active material layer. If needed, the positive electrode active material layer may contain an arbitrary component, such as an electrically conductive agent.

As the positive electrode active material, a lithium composite oxide is preferable. As a transition metal, for example, there may be mentioned Sc, Y, Mn, Fe, Co, Ni, Cu, or Cr. Among those metals mentioned above, for example, Mn, Co, or Ni is preferable. As a particular example of the lithium composite oxide, although $LiCoO_2$, $LiNiO_2$, $LiMn_2O_4$, or the like may be mentioned, the lithium composite oxide is not limited thereto.

(Separator)

As the separator, for example, a resin-made fine porous film, a non-woven cloth, or a woven cloth may be used. As the resin, for example, a polyolefin, such as a polyethylene or a polypropylene, a polyamide, or a poly(amide imide) may be used.

(Electrolyte Liquid)

The electrolyte liquid contains a solvent and a solute dissolved in the solvent. As the solute, various lithium salts may be used. The concentration of the lithium salt in the electrolyte liquid is, for example, 0.5 to 1.5 mol/L.

As the solvent, for example, there may be mentioned a nonaqueous solvent, that is, a cyclic carbonate ester, such as propylene carbonate (PC) or ethylene carbonate (EC); a chain carbonate ester, such as diethyl carbonate (DEC), ethyl methyl carbonate (EMC), or dimethyl carbonate (DMC); or a cyclic carboxylic acid ester, such as γ-butyrolactone or γ-valerolactone. Those solvents may be used alone, or at least two types thereof may be used in combination.

As the lithium salt, for example, there may be mentioned $LiPF_6$, $LiBF_4$, $LiClO_4$, $LiAsF_6$, $LiCF_3SO_3$, $LiN(SO_2F)_2$ (LiFSI), $LiN(SO_2CF_3)_2$. The lithium salts may be used alone, or at least two types thereof may be used in combination. In particular, LiFSI is preferable since the electrical conductivity of a nonaqueous electrolyte liquid which uses a nonaqueous solvent as the solvent is improved. Since the ion permeability film suppresses the decomposition of LiFSI in the nonaqueous electrolyte liquid, an effect of improving the electrical conductivity by LiFSI can be significantly obtained. In addition, SEI generated by reduction decomposition of LiFSI contains a sulfur element. Since the sulfur element in SEI functions as a polar portion, the interaction between SEI and the ion permeability film is generated. It is believed that by the interaction as described above, the adhesion therebetween is improved, and hence, the durability of SEI is improved.

EXAMPLES

Hereinafter, although the present disclosure will be described in detail with reference to Examples and Comparative Examples, the present disclosure is not limited to the following Examples.

Example 1

According to the following procedure, a laminate type cell using a lithium metal as a counter electrode was formed.

(1) Formation of Negative Electrode

Natural graphite particles (average particle diameter (D50): 7.50 μm, and BET specific surface area: 6.93 m²/g), at least parts of surfaces of which were covered with amorphous carbon formed from pitch used as a raw material, were used as negative electrode active material particles. The amount of the amorphous carbon was 5 parts by mass with respect to 100 parts by mass of the graphite particles. The negative electrode active material particles and a binder were mixed with an appropriate amount of water, so that a negative electrode slurry was prepared. As the binder, a SBR and a CMC were used in combination. With respect to 100 parts by mass of the negative electrode active material particles, 1 part by mass of the SBR and 1 part by mass of the CMC were blended. In addition, the amorphous carbon was formed by a method in which after a mixture of natural graphite particles and a pitch were sufficiently mixed together, in a nitrogen atmosphere, firing was performed at 1,000° C.

After the negative electrode slurry was applied on one surface of copper foil (negative electrode collector) having a thickness of 10 μm, the coating film thus formed was dried and rolled, so that a negative electrode precursor was formed. The total thickness of the negative electrode active material layer and the negative electrode collector was 150 μm.

After the negative electrode precursor was received in a predetermined reaction chamber, by the following procedure, an ion permeability film was formed on a surface of the negative electrode active material layer, and subsequently, a predetermined shape was obtained therefrom by punching and was used a negative electrode. The size of the negative electrode active material layer was set to 2 cm by 2 cm (4 cm²).

(i) In the reaction chamber in which the negative electrode precursor was received, a first raw material (trimethyl phosphate) used as a supply source of an element M (phosphorus: P) and an element A (oxygen: O) was introduced by vaporizing. The temperature of an atmosphere containing the first raw material was controlled at 120° C., and the pressure thereof was controlled at 260 Pa. After 30 seconds passed, it was assumed that the surface of the negative electrode active material layer was covered with a monomolecular layer of the first raw material, and an excess first raw material was purged by a nitrogen gas.

(ii) Next, in the reaction chamber in which the negative electrode precursor was received, a second raw material (lithium(bistrimethylsilyl)amide) used as a supply source of lithium was introduced by vaporizing. The temperature of an atmosphere containing the second raw material was controlled at 120° C., and the pressure thereof was controlled at 260 Pa. After 30 seconds passed, it was assumed that the monomolecular layer of the first raw material reacted with the second raw material, and an excess second raw material was purged by a nitrogen gas.

(iii) A series of operations including the introduction of the first raw material, the purge, the introduction of the second raw material, and the purge was repeatedly performed 100 times, so that an ion permeability film of a lithium compound was formed.

When the composition of the ion permeability film was analyzed by XPS, IPC, or the like, a lithium phosphate having a composition formula of $Li_3PO_4$ was confirmed.

The mass of the ion permeability film with respect to 100 parts by mass of the negative electrode active material particles obtained from the mass of the negative electrode precursor before the ion permeability film was formed, the mass of the negative electrode after the ion permeability film was formed, the composition of the negative electrode active material layer, and the specific gravities of the individual materials was 1.5 parts by mass.

The thickness of the ion permeability film was estimated to be in a range of 10 to 25 nm based on the number of the series of operations by ALD.

(2) Formation of Counter Electrode

Metal lithium foil having a thickness of 300 μm and a size of 2.5 cm by 2.5 cm (6.25 cm$^2$) was used as a counter electrode.

(3) Preparation of Nonaqueous Electrolyte Liquid

To 100 parts by mass of a mixed liquid containing EC and EMC at a mass ratio of 1:3, 1 part by mass of vinylene carbonate was added, so that a nonaqueous solvent was obtained. LiPF$_6$ was dissolved in the nonaqueous solvent at a concentration of 1.0 mol/L, so that a nonaqueous electrolyte liquid was prepared.

(4) Assembly of Laminate Type Cell

The negative electrode and the counter electrode were laminated with a separator interposed therebetween, so that an electrode group was formed. To the negative electrode and the counter electrode, respective nickel-made leads were connected. In a laminate film-made exterior package having a barrier layer formed from aluminum foil, the electrode group was received together with the nonaqueous electrolyte liquid in a reduced-pressure environment. In this case, the individual leads were extended outside through openings of the exterior package, so that a cell A1 was formed.

Example 2

Except that natural graphite particles (average particle diameter (D50): 7.27 μm, and BET specific surface area: 7.68 m$^2$/g), at least parts of surfaces of which were covered with amorphous carbon formed from pitch and carbon black (average particle diameter (D50): 60 nm, and BET specific surface area: 25 m$^2$/g) used as a raw material, were used as negative electrode active material particles, a cell A2 was formed in a manner similar to that of Example 1, and evaluation thereof was performed similar to that described above. The amount of the amorphous carbon with respect to 100 parts by mass of the graphite particles was 8 parts by mass, and the amount of the carbon black thereof was 3 parts by mass.

Comparative Example 1

Except that by simply using graphite particles (average particle diameter (D50): 50 μm), the surfaces of which were not covered with amorphous carbon, a negative electrode precursor was formed, and without forming the ion permeability film thereon by ALD, the negative electrode precursor was used as a negative electrode, a cell B1 was formed in a manner similar to that of Example 1, and evaluation thereof was performed similar to that described above.

Comparative Example 2

Except that by simply using graphite particles (average particle diameter (D50): 50 μm), the surfaces of which were not covered with amorphous carbon, a negative electrode precursor was formed, a cell B2 was formed in a manner similar to that of Example 1, and evaluation thereof was performed similar to that described above.

Comparative Example 3

Except that a negative electrode precursor on which no ion permeability film was formed by ALD was used as a negative electrode, a cell B3 was formed in a manner similar to that of Example 1, and evaluation was performed similar to that described above.

Comparative Example 4

Except that a negative electrode precursor on which no ion permeability film was formed by ALD was used as a negative electrode, a cell B4 was formed in a manner similar to that of Example 2, and evaluation thereof was performed similar to that described above.

[Evaluation 1]

By using the cell immediately after the assembly, the negative electrode was charged to 0 V at 25° C. at a constant current (0.35 mA) corresponding to 0.05 C, and subsequently, the negative electrode was discharge to 1.5 V. As described above, a first discharge capacity D1 was obtained. Next, by using the cell, the negative electrode was again charged to 0 V at a constant current corresponding to 0.05 C, and in a state in which a cell voltage was 0 V, the cell was stored at 60° C. for 5 days. Subsequently, the negative electrode was discharged to 1.5 V, so that a second discharge capacity F1 was obtained.

In addition, a capacity remaining rate (E) was obtained by E (%)=100×F1/D1.

[Evaluation 2]

After the cell, the capacity remaining rate (E) of which was measured, was disassembled, the negative electrode was recovered and washed with EMC, followed by drying at 30° C. for 24 hours. At a portion of a multilayer film which covered the surface of the negative electrode active material layer, the multilayer film including the ion permeability film and SEI formed at the outside thereof, the analysis was performed in a thickness direction by XPS. The analytical conditions are as follows.

Radiation Source: Al Kα

Etching ion: Ar (2 keV)

As a result, a concentration C1 of phosphorus (P) had the maximum value in a direction from a surface side of SEI formed at the outside of the ion permeability film to a bonding interface between the ion permeability film and the negative electrode active material particles. A concentration C1max at the maximum value was approximately 2 times a concentration C1sr at a surface side (a depth of 15% of the thickness from the topmost surface of SEI) of the multilayer film.

[Evaluation 3]

A reaction resistance of the negative electrode active material layer was measured by alternating current impedance measurement (frequency: 100 mHz to 1 MHz, and amplitude: 10 mV). It can be said that as the reaction resistance is decreased, the input/output characteristics of the negative electrode are improved. After the cell was charged at 25° C. at a constant current corresponding to 0.2 C to an SOC of 50% (50% of full charge), the impedance measurement was performed. By analysis of the Cole-Cole plot obtained from the measurement result, the reaction resistance of the negative electrode was obtained.

The Cole-Cole plot obtained from the measurement result showed a semicircular arc. Since the diameter length of the semicircle represents the reaction resistance of the negative electrode, the diameter of the semicircle was obtained with respect to the real axis direction of the plot and was used as the index of the reaction resistance. The value of the cell B1 of Comparative Example 1 was regarded as the standard value (100%), and the relative value of the negative electrode resistance of each cell was calculated.

The results of Examples 1 and 2 and Comparative Examples 1 to 4 are shown in Tables 1 and 2.

TABLE 1

| CELL | AMORPHOUS CARBON | ION PERMEABILITY FILM | CARBON BLACK | REACTION RESISTANCE (%) |
|---|---|---|---|---|
| B1 | NO | NO | NO | 100 |
| B2 | NO | YES | NO | 85.8 |
| B3 | YES | NO | NO | 70.2 |
| A1 | YES | YES | NO | 54.3 |
| B4 | YES | NO | YES | 73.7 |
| A2 | YES | YES | YES | 53.6 |

As shown in Table 1, since the ion permeability film was formed on the surface of the active material particle with the amorphous carbon interposed therebetween, the reaction resistance was significantly apparently reduced, and the reduction rate was decreased to approximately 46%. As a result, the input/output characteristics are also believed to be significantly improved.

TABLE 2

| CELL | AMORPHOUS CARBON | ION PERMEABILITY FILM | CARBON BLACK | CAPACITY REMAINING RATE E (%) |
|---|---|---|---|---|
| B3 | YES | NO | NO | 91.2 |
| A1 | YES | YES | NO | 94.2 |
| B4 | YES | NO | YES | 93.3 |
| A2 | YES | YES | YES | 95.0 |

As shown in Table 2, since the ion permeability film was formed on the surface of the active material particle with the amorphous carbon interposed therebetween, the capacity remaining rate was significantly increased. In particular, in A2 in which the carbon black and the ion permeability film were used in combination, a significant improvement of the capacity remaining rate was observed. The reason for this is believed that by the function of the carbon black, the following properties of the ion permeability film and the generated SEI to the expansion and the contraction of graphite in association with charge/discharge are improved.

INDUSTRIAL APPLICABILITY

The negative electrode according to the present disclosure is useful as a negative electrode of a secondary battery which is used, for example, for a drive power source of a personal computer, a cell phone, a mobile device, a personal digital assistance (PDA), a mobile game device, a video camera, or the like; a main power source or an auxiliary power source of an electric motor drive for a hybrid electric automobile, a fuel cell automobile, a plug-in HEV, or the like; or a drive power source for an electric tool, a cleaner, a robot, or the like.

REFERENCE SIGNS LIST 1 secondary battery
10 winding type electrode group
11 square type battery case
12 sealing plate
13 negative electrode terminal
14 positive electrode lead
15 negative electrode lead
16 gasket
17 sealing plug
17a liquid charge port
18 frame body

The invention claimed is:

1. A secondary-battery negative electrode comprising:
a negative electrode collector; and
a negative electrode active material layer provided on a surface of the negative electrode collector,
wherein the negative electrode active material layer includes active material particles and amorphous carbon which covers at least parts of surfaces of the active material particles,
at least a part of a surface of the amorphous carbon is covered with a film having a lithium ion permeability,
the film contains an element M, and the element M is at least one selected from the group consisting of V, Nb, Ti, La, and Ta,
the amorphous carbon is a composite of carbon black and a fired product of pitch or tar, wherein a concentration of the carbon black in the amorphous carbon is 10 to 50 percent by mass,
wherein the film is formed on the surface of each of the active material particles with the amorphous carbon interposed between said film and said surface of each of the active material particles, and
wherein the active material particles are formed of a negative electrode active material selected from the group consisting of a silicon element, a silicon compound, and a silicon alloy.

2. The secondary-battery negative electrode according to claim 1,
wherein the film further contains a lithium compound containing the element M, an element A, and lithium, and
the element A is at least one selected from the group consisting of F, S, O, N, and Br.

3. The secondary-battery negative electrode according to claim 1, wherein the fired product of pitch or tar is fired pitch.

4. A secondary battery comprising: a positive electrode; the negative electrode according to claim 1; and a nonaqueous electrolyte having a lithium ion conductivity.

5. The secondary battery according to claim 4, wherein the nonaqueous electrolyte contains lithium bisfluorosulfonylimide.

6. A secondary-battery negative electrode comprising:
a negative electrode collector; and
a negative electrode active material layer provided on a surface of the negative electrode collector, wherein the negative electrode active material layer includes active material particles and amorphous carbon which covers at least parts of surfaces of the active material particles, at least a part of a surface of the amorphous carbon is covered with a film having a lithium ion permeability, the film contains an element M, and the element M is at least one selected from the group consisting of P, Si, B, V, Nb, Ti, Zr, Al, Ba, La, and Ta, the film further covers a part of the surface of the negative electrode collector, the amorphous carbon is a composite of carbon black and a fired product of pitch or tar, wherein a concentration of the carbon black in the amorphous carbon is 10 to 50 percent by mass, wherein the film is formed on the surface of each of the active material particles with the amorphous carbon interposed between said film and said surface of each of the active material particles, and wherein the active material particles are formed of a negative electrode active material selected from the group consisting of a silicon element, a silicon compound, and a silicon alloy.

7. The secondary-battery negative electrode according to claim 6,
wherein the film further contains a lithium compound containing the element M, an element A, and lithium, and
the element A is at least one selected from the group consisting of F, S, O, N, and Br.

8. The secondary-battery negative electrode according to claim 6, wherein the fired product of pitch or tar is fired pitch.

9. A secondary battery comprising: a positive electrode; the negative electrode according to claim 6; and a nonaqueous electrolyte having a lithium ion conductivity.

10. The secondary battery according to claim 9, wherein the nonaqueous electrolyte contains lithium bisfluorosulfonylimide.

11. The secondary-battery negative electrode according to claim 1,
wherein said surface of each of the active material particles is covered with a multilayer film including the film as an inner layer and a solid electrolyte interface as an outer layer.

* * * * *